UNITED STATES PATENT OFFICE.

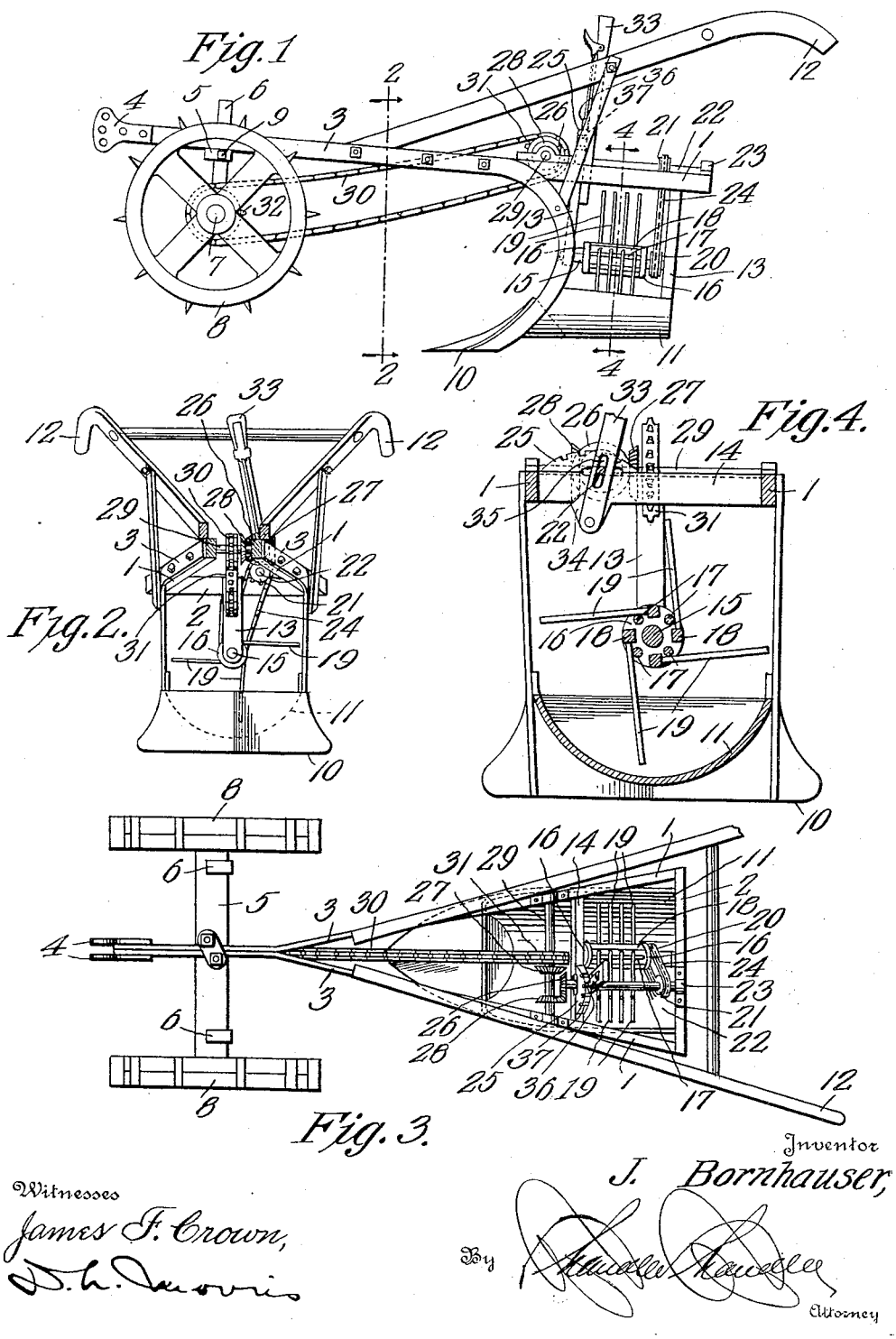

JOHN BORNHAUSER, OF COLVILLE, WASHINGTON.

POTATO-DIGGER.

1,196,075.  Specification of Letters Patent.  Patented Aug. 29, 1916.

Application filed March 7, 1916. Serial No. 82,701.

*To all whom it may concern:*

Be it known that I, JOHN BORNHAUSER, a citizen of the United States, residing at Colville, in the county of Stevens, State of Washington, have invented certain new and useful Improvements in Potato-Diggers; and I do hereby declare the following to be a full, clear, and exact description of the invention, such as will enable others skilled in the art to which it appertains to make and use the same.

This invention relates to a potato digger.

An object of the invention resides in the provision of a digger by means of which potatoes will be dug from the ground, separated from the dirt and deposited in a row beside the hills.

A further object of the invention resides in so constructing the device that the potatoes will be thrown from the same side of the hills irrespective of the direction in which the machine is traveling.

A further object of the invention resides in the provision of a machine which will be cheap to manufacture and easy to operate.

With these and other objects in view, such as will appear as my description progresses, my invention comprises the combination and arrangement of parts as set forth in and falling within the scope of the appended claims.

In the drawing: Figure 1 is a side elevation of a machine constructed in accordance with my invention; Fig. 2 is a vertical sectional view on line 2—2 of Fig. 1; Fig. 3 is a top plan view, and Fig. 4 is a vertical sectional view on line 4—4 of Fig. 1.

In the embodiment of the invention shown in the drawing, I have provided a triangular frame which includes side bars 1 and a rear bar 2. Secured to the side bars 1 and extending forwardly therefrom are bars 3 which are secured together at their forward ends and are provided with a clevis 4. Secured to these bars is a beam 5, which beam is adjustable vertically on a pair of arms 6. These arms 6 are carried by an axle 7 on which wheels 8 are mounted, the beam being held in place upon the arm by set screws 9. The rear portions of the bars 3 are curved downwardly and support a plow point 10. Secured to and extending rearwardly from the downwardly curved portions is a semi-cylindrical apron 11 so that when the potatoes are dug from the ground by the point 10 they will travel onto the apron. Extending upwardly from the bars 3 is a pair of handles 12 by means of which the machine may be guided.

In order that the potatoes may be separated from the dirt on the apron and thrown from the sides of the same, I have provided a pair of depending brackets 13 which extend downwardly from the rear bar 2 of the frame and a cross or brace bar 14. An axle 15 extends between and is rotatably mounted in the lower ends of these brackets and secured to this axle is a drum which includes a pair of spaced disks 16 and a plurality of rods 17 which extend between the disks slightly inwardly of their peripheries.

Extending between the disks 16 and rotatably mounted therein are shafts 18 which are arranged alternately with the rods 17 and extending from these shafts 18 at right angles is a plurality of fingers 19 which form the potato engaging fingers. By arranging the shafts 18 and fingers 19 in this manner when the drum is rotated in one direction the fingers will bear upon the adjacent rods and will be held firmly so that the potatoes will be engaged and thrown from the sides of the apron 15. Thus the drum may be rotated in either direction and the fingers will operate, their positions being reversed upon the reverse movement of the drum.

In order that the drum may be driven in either direction, I have secured a sprocket 20 to the shaft 15 and have mounted a second sprocket 21 on a shaft 22, which shaft is rotatably mounted in bearings 23 on the rear bar 2 and the brace bar 14. A chain 24 passes over the sprockets 20 and 21. The end of the shaft which is mounted in the bearing 25 on the brace 14 extends through a horizontal slot in the bearing so that the shaft may be shifted from side to side. This end of the shaft is provided with a beveled gear 26 which is adapted to mesh with either of a pair of gears 27 and 28 which are carried by a shaft 29. Motion is imparted to this shaft by means of a chain 30 which passes over a sprocket 31 on the shaft and a sprocket 32 on the front axle 7.

In order that the shaft 22 may be moved so as to shift the gear 26 from one to the other of the gears 27 and 28, I have pivoted a lever 33 on a plate 34, which lever is provided with a slot 35 through which the shaft 22 extends. This lever is provided with a pawl 36 which coöperates with a quadrant rack 37 to maintain the lever in either of its positions. It will thus be seen that by shifting the lever the gear 26 may be engaged with either of the gears 27 or 28 and thus the motion of the drum may be reversed so that the potatoes will be thrown from either one side or the other of the apron.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In a potato digging machine, the combination with a supporting frame, of a shovel depending therefrom, an apron extending rearwardly from the shovel, a drum supported above the apron including a plurality of pivotally mounted radially extending fingers, means for rotating the drum in either direction and means for causing the fingers to rotate rigidly with the drum.

2. In a potato digging machine, the combination with a supporting frame, of a shovel depending therefrom, an apron extending rearwardly from the shovel and means for throwing potatoes from either side of the apron, which means include a shaft supported by the frame, spaced disks secured to the shaft, rods extending between and secured to the disks, shafts extending between and rotatably mounted in the disks, said shafts and rods being arranged alternately and a plurality of fingers extending outwardly from the shafts and adapted to bear against the adjacent rods.

3. In a potato digging machine, the combination with a supporting frame, of a shovel depending therefrom, an apron extending rearwardly from the shovel, a drum rotatably mounted above the apron and including a pair of spaced disks, shafts extending between the disks and rotatably mounted therein, fingers mounted on the shafts and extending outwardly at right angles thereto and rods arranged on each side of each of the shafts against which the fingers are adapted to bear, said rods being arranged inwardly of the peripheries of the disks and means for rotating the drum in either direction.

In testimony whereof, I affix my signature, in the presence of two witnesses.

JOHN BORNHAUSER.

Witnesses:
H. T. WENTZ,
H. WARD BAILEY.

Copies of this patent may be obtained for five cents each, by addressing the "Commissioner of Patents, Washington, D. C."